Dec. 22, 1936. A. L. FREEDLANDER 2,065,180
METHOD OF MAKING DRIVING BELTS
Original Filed March 27, 1935   2 Sheets-Sheet 2

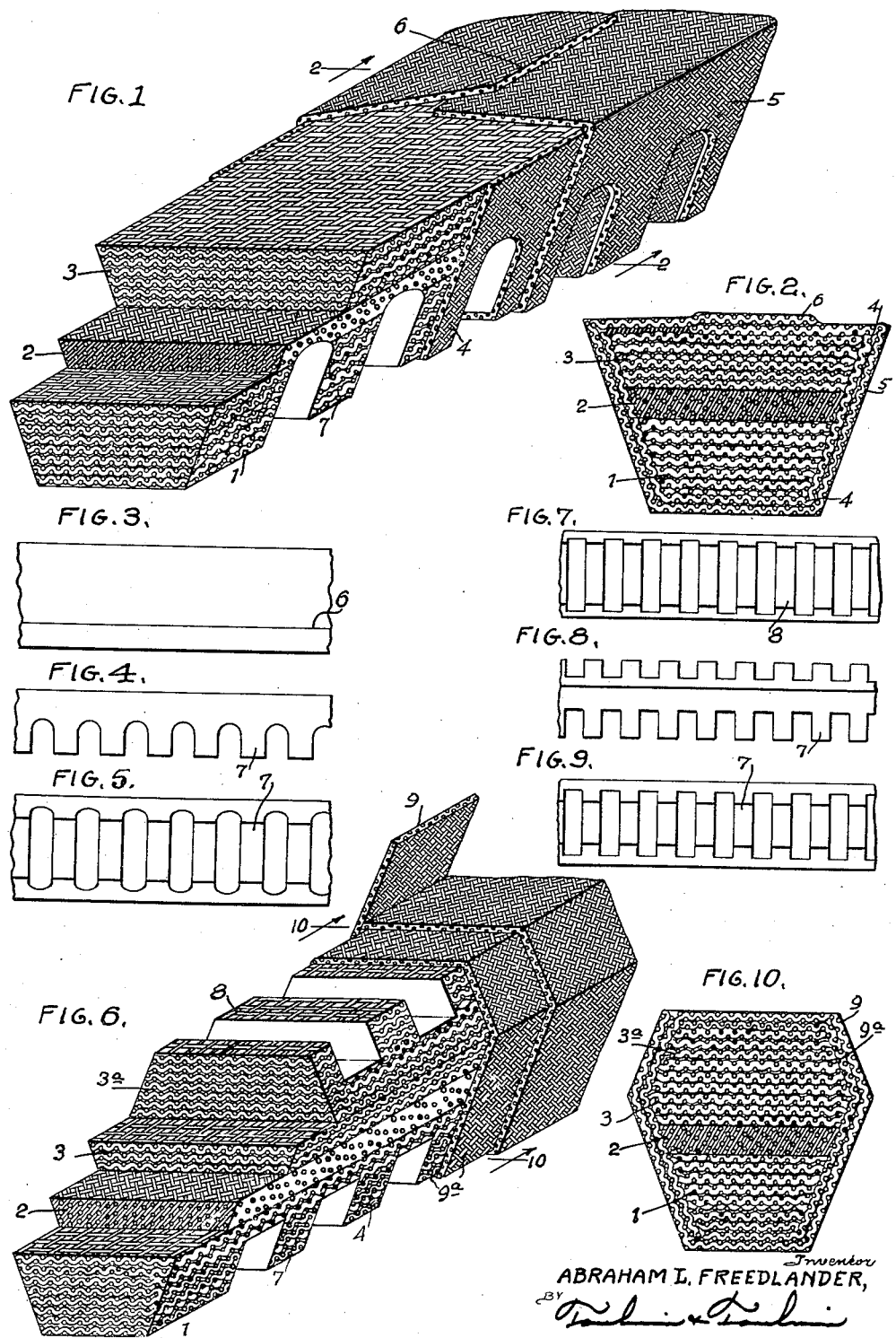

ABRAHAM L. FREEDLANDER,
Inventor

Attorneys

Patented Dec. 22, 1936

2,065,180

UNITED STATES PATENT OFFICE 2,065,180

METHOD OF MAKING DRIVING BELTS

Abraham L. Freedlander, Dayton, Ohio, assignor to The Dayton Rubber Manufacturing Company, Dayton, Ohio, a corporation of Ohio Original application March 27, 1935, Serial No. 13,305. Divided and this application August 5, 1935, Serial No. 34,674

3 Claims. (Cl. 154—4)

My invention relates to belts.

It is my object to provide a belt having transversely rigid compression and tension zones and an intermediate flexible zone that serves to support and accommodate the movements of the compression and tension zones.

In particular it is the object to provide a belt having a square-woven, rubberized fabric tension section and a similar compression section on either side of a bias-woven, intermediate section, preferably in combination with teeth formed in the compression section and a wrapper or wrappers enclosing the entire belt.

It is the object to provide a belt that is hexagonal in section composed of a plurality of layers of rubber and fabric material which will not turn over in the grooves of the pulley despite the angularity of the driving with respect to the driven pulley.

It is a further object to provide in such a belt a plurality of sheared teeth on the under side of the belt and optionally on the upper side of the belt so as to permit of the belt passing over pulleys of small diameter mounted on close driving centers without dislodging the belt from the pulleys when one pulley swings with respect to the other.

It is a further object of the invention to provide a neutral axis belt having tension and compression areas on either side of the neutral axis in a belt having six sides and preferably with teeth sheared from the compression and tension areas.

It is a further object to provide in a belt of this character a wrapper.

This application is a division of my application Serial No. 13,305, filed March 27, 1935.

Referring to the drawings, Figure 1 is a perspective partially cut away to disclose the belt construction and the multiple cover construction.

Figure 2 is a section on the line 2—2 of Figure 1.

Figure 3 is a top plan view.

Figure 4 is a side elevation.

Figure 5 is a bottom plan view.

Figure 6 is a perspective of a modified belt cut away by steps with the cover partially removed showing the teeth in the compression and tension sections.

Figure 7 is a top plan view of the belt of Figure 6.

Figure 8 is a side elevation of the belt of Figure 6.

Figure 9 is a bottom plan view of the belt of Figure 6.

Figure 10 is a section on the line 10—10 of Figure 6.

Figure 11:
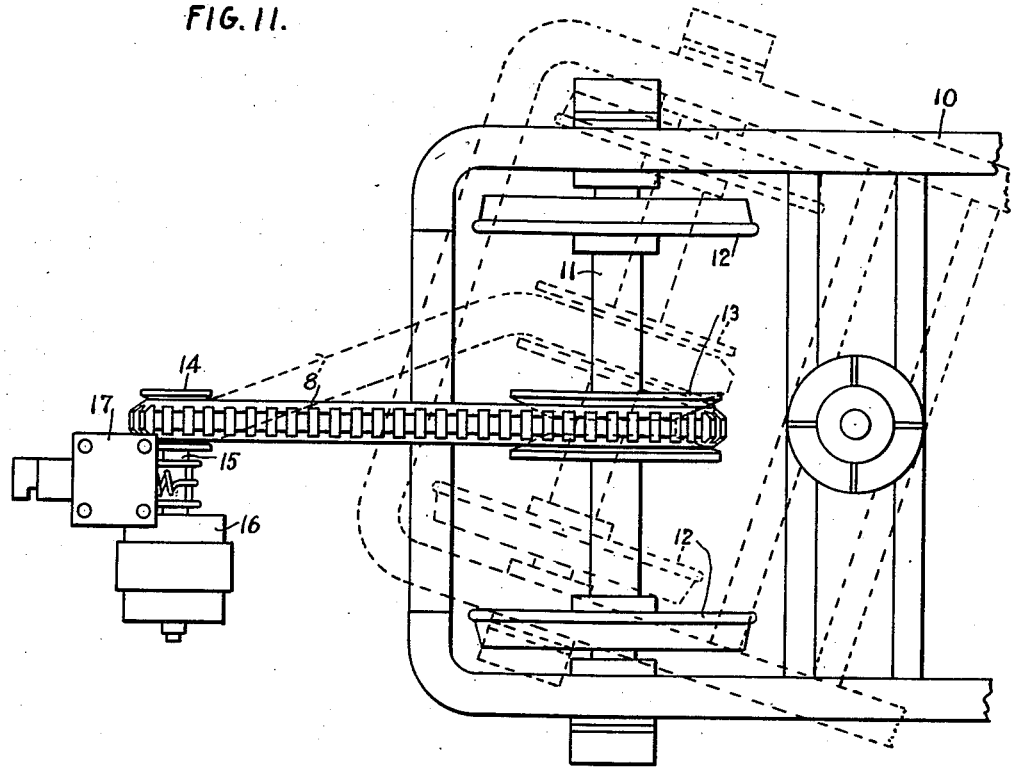
Figure 11 is a diagrammatic view of the belt of this invention showing the positions it assumes when a driving pulley, as on a railway truck, swings with respect to the driven pulley on a generator.

Referring to the drawings in detail, the compression section in the belt of Figure 1 is formed of a plurality of layers designated 1 of square-woven fabric impregnated with rubber. Superimposed upon these layers is a plurality of layers of bias-woven fabric indicated at 2 constituting an intermediate section to relieve the relative movements of the tension and compression sections. The neutral axis of the belt is located in the tension section. Mounted upon the intermediate section is a plurality of square-woven layers of fabric embedded in rubber designated 3. A U-shaped cover embracing the sides and bottom of the belt is provided at 4. This cover is composed of bias fabric impregnated with rubber. Superimposed upon this cover is a four-sided cover of bias fabric designated 5 and overlapping at 6. The teeth 7 are formed in the compression section by the shearing of the square-woven fabric and rubber. The belt is vulcanized in the usual manner.

It will be observed from this belt that it is possible to use square woven fabric that is strong transversely of the belt for both the compression and tension sections. Bias-woven fabric is placed just below the neutral axis area in the tension section.

Referring to the belt in Figures 6 to 10, I provide a belt having a plurality of superimposed layers of square-woven fabric embedded in rubber as at 1 forming a compression section. Bias-woven fabric is embedded in rubber as at 2 just below the neutral axis section 3. A third section, including the neutral axis, of square-woven fabric layers embedded in rubber is formed at 3. Superimposed upon the layers 3 are similar layers 3a, forming the tension section, the side walls of which approach one another towards the top of the belt, thus forming a hexagonal belt.

The compression section 1 is cut away to form the teeth 7 and then 3a is cut away to form the teeth 8. A wrapper which is preferably of double thickness is wrapped around the belt and is designated 9 and 9a.

Referring to Figure 11, which shows a typical mounting of such a belt that is used for driving generators from axles of railway car trucks, 10 designates the frame of the truck having an axle 11 and wheels 12. The axle 11 has mounted thereon the pulley 13 which drives the belt. The driven pulley is designated 14 and is connected on the shaft 15 to the generator 16. The generator is fixed by the attaching plate 17 to the car body.

The term "V-pulley" turning on a swivel axis is intended to mean where said pulley and its mounting move either by a swivel movement or by a movement such as would be obtained when the pulley is mounted on a truck pivoted to a car body, as shown in Figure 11. In the United States and Canada railway truck curves, particularly in yards or stations, may cause the angle between the truck and the car body to be out of alignment as much as 23 degrees. In driving generators, blowers, or other equipment on railway cars, one pulley is mounted on the truck so as to be driven by the wheels of the truck and the other pulley is mounted on a stationary part of the railway car. The present belt will not roll out of the V-curves even when the truck assumes a position of as high as 23 degrees with reference to the car body. A V-type belt of a cross section such as shown herein allows the belt to have only a minimum surface of contact with the sides of the pulley groove. While normally this would be considered an advantage, yet in the present instance it is a disadvantage to have any more frictional contact than is necessary to effect the driving and to prevent slipping, because, in going around a curve, either one side of the belt or the other, according to whether a left hand or a right hand curve is being negotiated, presses very heavily against the side of the pulley groove, and the belt has to slide up and down along the face of the pulley to take care of the shortened distance. If the side driving faces are of maximum height the belt can not slide freely and would tend to hang and turn over in the pulley groove. The present belt is so shaped to be thick enough to transmit the load but at the same time it does not increase the side driving surface. This added thickness permits the belt to have enough screw strength to permit the use of a connector for connecting the ends of the belt when desired.

In the present invention the superimposed layers permit lateral flexibility of the belt without dislodging it from the V-grooves of the pulleys. This lateral flexibility is accomplished without sacrifice of strength by the arrangement of the several sections of the belt with the woven fabric at angles to one another. The covers additionally provide a uniform, smooth, side bearing surface despite the lateral flexing of the belt or the bending of the belt. By arranging a large number of layers of fabric embedded in rubber at angles to one another in a series of superimposed planes, it is possible to provide uniform deflection without bulging, either by lateral movement of the belt or by bending movement of the belt. This is particularly true when the belt is hexagonal in cross-section as the resistance to bending laterally is primarily in the broadest portion of the belt and in the uppermost portion of the belt.

In the construction of the belt of this invention, by using the square-woven fabric for the tension and compression sections, relatively incompressible bodies so far as lateral compression is concerned, are provided, while the greater length of the belt as compared with the transverse dimension, will provide sufficient compressibility and extensibility of the sections to constitute tension and compression sections. The neutral axis area is in the lower layers of the tension section.

This arrangement is made possible by the use of the intermediate, more highly flexible section joining the other two sections. This intermediate flexible section is square-woven fabric laid on the bias and is designated 2. It preferably contains a larger amount of rubber, which I have indicated in black. The combination of the increased amount of rubber over that found in the tension and compression sections and the bias arrangement of the square woven fabric of the section 2 provides a relatively stretchable section that acts as an accommodating area between the upper and lower tension and compression sections when they are passing around extremely short centers or there is a lateral swinging of one end of the belt with respect to the other when used as shown in Figure 11. This relatively yieldable internal section 2 permits of short center driving, driving on small pulleys, and of use with pulleys that swing with respect to one another. As this intermediate section 2 is immediately adjacent the neutral axis of the belt where the minimum movement should take place, this intermediate section 2 accommodates the relative movement of the compression section. It also permits of the cut away portions forming the teeth being extended to a depth greater than the depth of the compression section so that the compression section may be comprised, when desired, in reality of a series of compression section teeth held together by the intermediate bias fabric zone 2.

Figure 12:
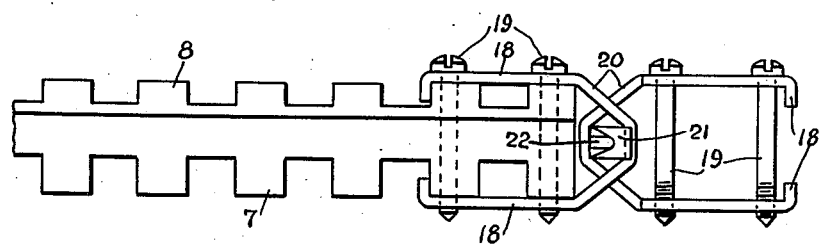
Figure 12 is a side elevation of one end of the belt and the connector.

When the belt is used as shown in Figure 11, it is preferably an end belt, the ends of which are joined, as shown in Figure 12, by a connector. The connector comprises a clamp 18 retained by screw bolts 19 that pass completely through the belt and all of its sections. The ends of the connector at 20 interengage one another by interlacing in the usual manner and have interposed between them the bearing block 21 and the pintle pin 22. The details of this connector form no part of this invention and it is merely illustrated to show the adaptability and method of use of this belt.

In the manufacture of this belt, the layers of square-woven rubberized fabric form a section 1 all wound on one another concentrically; then the same layers of rubberized or rubber-imbedded square-woven fabric arranged on the bias are wound on section 1; and then a plurality of layers similar to section 1 are wound thereon to form section 3. If it is desired to provide a cover on the belt, the belt material is cut in trapezoid or hexagonal section and the cover is wrapped thereon. If it is desired to form teeth on either the upper or under side of the belt, or both, the material is sheared away to form the teeth either before or after the cover is applied.

It will be understood that I desire to comprehend within my invention such modifications as may be necessary to adapt it to varying conditions and uses.

Having thus fully described my invention, what I claim as new and desire to secure by Letters Patent is:

1. In a method of making a belt, winding a plurality of superimposed layers of square-woven rubberized fabric with the threads parallel to the longitudinal and transverse axes of the belt, winding thereon a plurality of square-woven layers of fabric arranged on the bias and embedded in rubber, and winding thereon a plurality of square-woven layers of rubberized fabric with the threads thereon arranged parallel to the longitudinal and transverse axes of the belt to form a belt of polygonal cross section.

2. In a method of making a belt, winding a plurality of superimposed layers of square-woven rubberized fabric with the threads parallel to the longitudinal and transverse axes of the belt, winding thereon a plurality of square woven layers of fabric arranged on the bias and embedded in rubber, winding thereon a plurality of square-woven layers of rubberized fabric with the threads thereon arranged parallel to the longitudinal and transverse axes of the belt to form a belt of polygonal cross section, and shearing a part of the belt on one side thereof to form teeth on at least one side thereof.

3. In a method of manufacturing a belt, winding a plurality of square-woven layers of rubberized fabric one on the other with the threads thereof parallel to the longitudinal and transverse axes of the belt; winding a second set of layers of rubberized fabric thereon with the threads of the second group of layers arranged at an angle to the first group of layers; winding a third group of square-woven layers of rubberized fabric on the second group with the threads parallel to the first group to form a belt of polygonal cross section; and vulcanizing the belt.

ABRAHAM L. FREEDLANDER.